Figure 1:
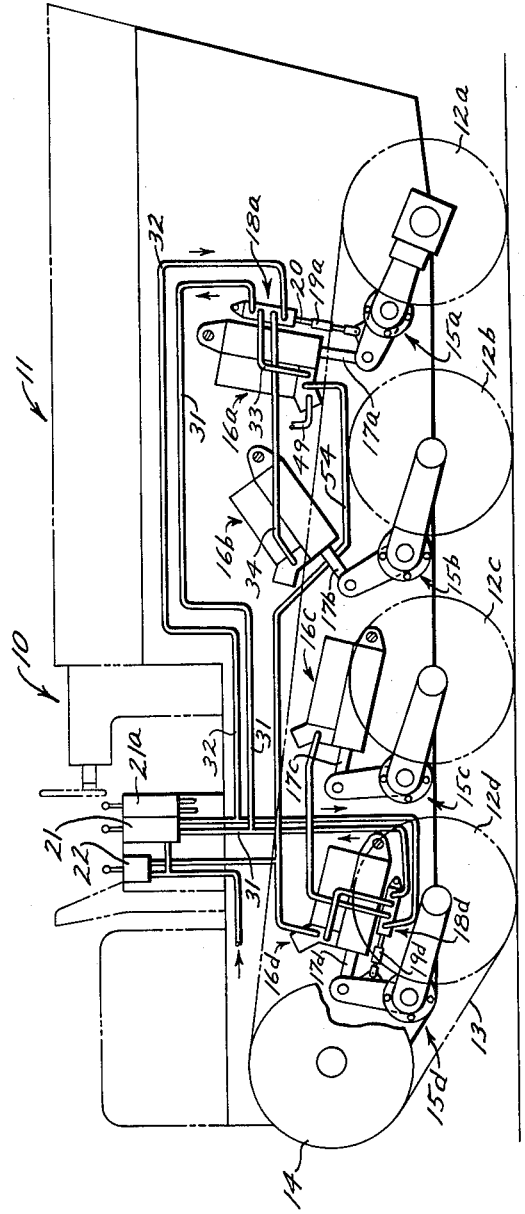

June 7, 1966

D. R. LARSEN 3,254,738

SUSPENSION SYSTEM FOR VEHICLES

Filed June 29, 1962

2 Sheets-Sheet 1

INVENTOR.
DORWIN R. LARSEN

BY

ATTORNEYS

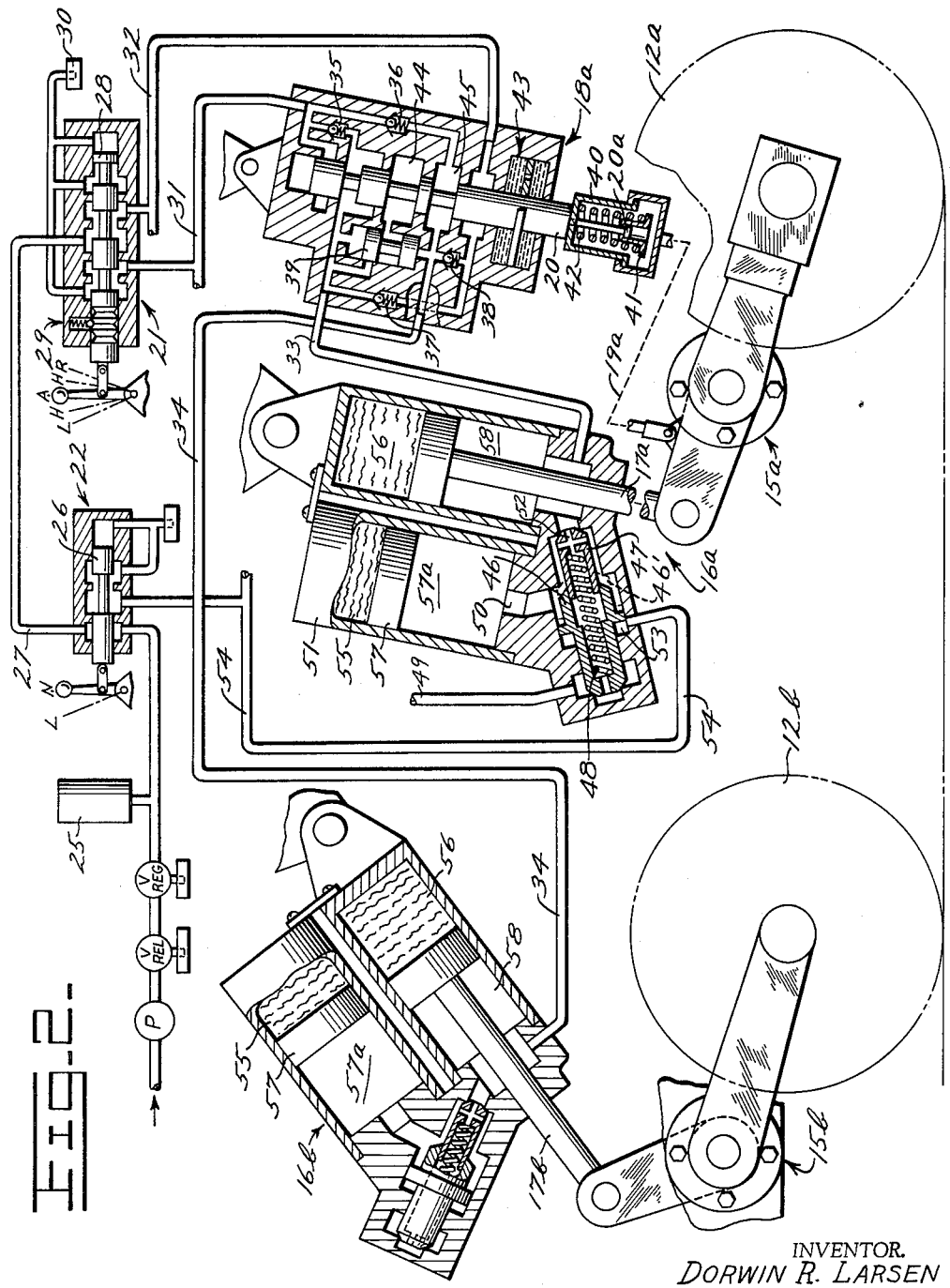

United States Patent Office 3,254,738
Patented June 7, 1966

3,254,738
SUSPENSION SYSTEM FOR VEHICLES
Dorwin R. Larsen, Washington, Ill., assignor to Caterpillar Tractor Co., Peoria, Ill., a corporation of California
Filed June 29, 1962, Ser. No. 206,327
14 Claims. (Cl. 180—9.2)

This invention relates to a suspension system for vehicles and more particularly relates to a hydro-pneumatic suspension system for selectively effecting spring rate changes for the supporting roadwheels of a track type vehicle to obtain the desired support therefor and afford the maximum efficiency thereto during various operating conditions.

Earthmoving vehicles of the track type generally comprise a plurality of supporting roadwheels or bogies positioned on the sides thereof to engage endless tracks. It is desirable to provide a suspension system for the roadwheels which will assure maximum operating efficiency when the vehicle is subjected to various working environments. For example, a loading of the earth retaining bowl thereof functions to disadvantageously effect control of the desired bowl height and scraper cutting depth due to the unbalanced forces distributed on the vehicle. Attempts have been made to provide an efficient suspension system between the roadwheels and vehicle frame to effectively move various portions of the vehicle to the desired operating position, which is generally substantially parallel relative to ground level, during selected phases of a working operation. Such systems are generally complex, bulky, and extremely costly and are often highly prone to mechanical failure.

This invention has provided a suspension system which is particularly adapted for use with track type vehicles, has overcome many of the above described difficulties and functions to efficiently support the roadwheels thereof to maintain the vehicle at a predetermined position above said roadwheels during all phases of vehicle operation. The system comprises spring rate change means operatively associated with each roadwheel adapted to individually pivot them into a selected position, preferably the above-mentioned predetermined position. Means are operatively associated with one roadwheel of each bogie and with the spring rate change means of each bogie roadwheel for uniquely changing their spring rates either selectively or automatically in response to an increased loading of said one roadwheel. Although this invention is hereafter described in connection with track type vehicles, it should be understood that novel concepts hereinafter presented may also be applied to wheel supported vehicles which are not of the endless track type.

An object of this invention is to provide a stable suspension system for vehicles which efficiently compensates for differential loading on the roadwheels thereof during various phases of vehicle operation.

Another object of this invention is to provide a suspension system for the bogies of track type vehicles which assures that when one of the bogie roadwheels encounters a heavy load the other roadwheel thereof will immediately equally share in the load supporting function.

A further object of this invention is to provide a suspension system for track type vehicles for effecting spring rate changes to the supporting roadwheels thereof by selectively or automatically distributing fluid pressure to roadwheel support jacks to thus obtain the type of suspension or support required for maximum efficiency during various phases of vehicle operation.

A still further object of this invention is to provide a suspension system for track type vehicles which is effective to selectively lock-out the four corner roadwheels thereof in various selected positions while yet permitting the spring rates of the intermediate roadwheels to be changed pursuant to differential vehicle loading.

Additional and more specific objects of this invention will become apparent from the following description taken in connection with the appended drawings wherein:

FIG. 1 is a side elevational view of the suspension system of this invention as it would appear in its operative arrangement with a track type vehicle, shown in broken lines; and FIG. 2 is a partial elevational view, schematically illustrating a suspension subsystem shown in FIG. 1 with various parts enlarged for clarification purposes.

The track type vehicle shown in broken lines in FIG. 1 comprises a tractor 10 and bowl 11 which is conventionally adapted for earthmoving purposes. The vehicle is adapted to be supported by roadwheels 12a–12d which engage endless tracks 13 driven by sprocket 14. The forward roadwheel 12a functions as an idler and may be operatively connected to a conventional recoil mechanism (not shown) so as to maintain the track taut during all phases of vehicle operation. An arrangement similar to that shown in FIG. 1 is also located on the other side of the vehicle.

The roadwheels are pivotally mounted on the vehicle by bellcrank assemblies 15a–15d which operatively connect to support jack assemblies or spring rate change means 16a–16d through reciprocating piston rods 17a–17d, respectively. Thus upward or downward movement of any one of the roadwheels will effect a reciprocation of the piston rod which is operatively connected thereto through the cooperating bellcrank assembly. Leveling valve assemblies 18a and 18d are operatively associated with the jack assemblies of the front and rear roadwheels 12a and 12d, respectively. As shown, mechanical linkages 19a and 19d pivotally connect a reciprocative spool member 20 to the respective bellcrank assemblies in much the same manner as piston rods 17.

As will be hereinafter more fully understood, leveling valve 18a communicates with a control valve 21, lock-out valve 22 and first and second jack assemblies or spring rate change means 16a and 16b to form an integrated fluid circuit. This fluid circuit forms a means which may be arranged to selectively or automatically effect spring rate changes by regulating and balancing the fluid pressure in the jack assemblies in order to selectively obtain the type of suspension or support required for maximum efficiency during selected phases of vehicle operation. Leveling valve 18d functions in a like manner in connection with the rear wheels 12c and 12d. As above stated, the arrangement shown in FIG. 1 is substantially duplicated on the other side of the vehicle. In this connection, it should be understood that the control and lock-out valve arrangements may be also so duplicated. However, in many vehicle applications, it is desirable to employ only one control and lock-out valve arrangement for simultaneously controlling the suspension system arrangements located on both sides of the vehicle. For example, a second control valve 21a may be suitably connected to certain of the bogie arrangements to effect selective individual control thereof to correct for unbalanced vehicle roadwheel loads or the like.

FIG. 2 discloses the integrated suspension subsystem for the front bogie, comprising roadwheels 12a and 12b. This subsystem is substantially duplicated in connection with the rear bogie comprising roadwheels 12c and 12d and like bogie arrangements (not shown) situated on the other side of the vehicle. Fluid pressure is initially introduced into the system through a conventional pump, relief valve and pressure regulator and is thereafter influenced by an accumulator 25 which functions to maintain a constant, predetermined fluid pressure level which is necessitated for satisfactory operation of the hereinafter more specifically described suspension system. As shown, the lock-out valve 22 may be manually actuated to selectively position spool 26 thereof. In the normal position N of the lock-out valve handle, pressurized fluid is free to flow through the lock-out valve and into a center chamber of control valve 21 by means of conduit 27.

The control valve may be manually actuated to position the spool 28 thereof for operations L, H, A, H and R which constitute lowering, holding, automatic, holding and raising phases of vehicle operation, respectively. A spring loaded detent mechanism 29 may be utilized to retain the spool in any one of these chosen positions. A sump 30 operatively communicates with selected internal passages of the control valve for fluid dumping purposes, hereinafter more fully explained.

Conduits 31 and 32 communicate with internal chambers formed in the control valve and further communicate with chambers formed in leveling valve 18a. Conduit 31 is arranged to selectively cooperate with conduits 33 and 34 which in turn communicate with jack assemblies 16a and 16b, respectively, primarily for a vehicle raising R operation. Spring loaded check valves 35 and 36 are arranged in tributaries formed in the leveling valve for this purpose and function to permit fluid passage whereby when the fluid in conduit 31 reaches a sufficient pressure level. In a somewhat like manner, conduit 32 terminates in communicating relationship with a fluid chamber formed in leveling valve 18, arranged to selectively communicate with conduit 33 for an automatic (A) or lowering (L) operation. As will hereinafter become more apparent, check valves 37 and 38 aid in these latter two operational functions. A sequence valve means 39 comprising a slidably mounted spool member is arranged to selectively communicate conduit 32 with conduit 33 subsequent to fluid flow from conduit 31 to conduit 34 during an automatic (A) operation.

As above stated, spool 20 is directly connected to roadwheel 12a through bellcrank assembly 15a and mechanical linkage 19a. The mechanical linkage is connected to a housing 40 which is slidably mounted on a shank of the spool and encapsulates an enlarged portion 20a thereof. A cup-shaped member 41 is mounted on this enlarged portion and is biased in a downward direction by compression spring 42 which also abuts housing 40, as shown. A conventional dash pot arrangement 43, comprising an apertured disc which is connected to the spool, is utilized for dampening purposes and functions in combination with spring 42 to prevent the leveling valve from becoming oversensitive to external vibrations and the like. As will be hereinafter more fully understood, chambers 44 and 45 of the valve are used to selectively communicate conduit 32 with conduits 33 and 34, pursuant to a shifting of spool 20.

The jack assembly 16a has a lock-out valve arrangement therein comprising a slidably mounted spool which forms two telescoping plunger sections 46 and 47, urged apart by spring 48. The lock-out valve is arranged to normally seal off a cross over-conduit 49 which communicates with a like jack assembly 16a (not shown) arranged on the opposite side of the vehicle. This arrangement also permits a reduced flow of fluid through passage 50 of a gas accumulator 51 by means of an orifice 52 formed in section 47 of the spool. Actuation of lock-out valve 22 to the L position functions to pressurize chamber 53 through conduit 54 to move section 46 to the dotted line position 46'.

Sealed gas chamber portions 55 and 56 function through pistons 57 and 17a to maintain preselected operating spring rates due to their damping coaction with balanced pressurized fluid chamber portions 57a and 58 of the assembly, respectively. As is well known in the art, in order to maintain a given suspension characteristic, fluid springs must be designed to assure a predetermined relation between vehicle wheel load and spring rate. In accordance therewith, fluid chambers 55 and 56 communicate through passage 50 and orifice 52 to provide this desired spring rate function during all phases of vehicle operation wherein load changes are imparted to roadwheel 12a. This arrangement makes possible the achievement of a four-to-one variable spring rate change, for example, which affords damping of reaction forces originating in the jack assemblies, a retention of a desired bowl height regardless of load, and an effecting of soft suspension characteristics for both an empty and fully loaded bowl.

In operation, when control valve 21 is maintained in the automatic or A position shown in FIG. 2, fluid is permitted to flow from accumulator 25, through lock-out valve 22, through conduit 27 and through an intermediate chamber formed in the control valve. The pressurized fluid thereafter flows into conduit 32 and leveling valve 18a wherein further passage of the fluid is blocked by check valves 37 and 38 and spool 20. Counter-clockwise pivoting of front roadwheel 12a, effected by encountering an obstruction or by loading the front portion of the tractor bowl 11 (FIG. 1), functions to lower spool 20 by means of linkage 19. Pressurized fluid will thereafter be permitted to flow from line 32 through chamber 45 and into chambers 57a and 58 of jack assembly 16b. This increased fluid pressure in the chambers effects a desired balanced spring rate increase for support of wheel 12b in a well known manner by selectively compressing the gas contained in sealed chambers 55 and 56.

Additional fluid pressure in line 34 functions to shuttle spool 39 in an upward direction to permit communication between chamber 44 and conduit 33. Thus, the fluid chambers 57a and 58 of jack assembly 16a also function to effect a spring rate increase whereafter piston 17a is moved in an upward direction to pivot roadwheel 12a in a clockwise direction and return the spool 20 to its original closed position. Conduit 32 is no longer maintained in communicating relationship with chambers 44 and 45 and the increased spring rate is thereafter maintained. Should the pressures in chamber 58 exceed a predetermined amount, check valves 37 and 38 permit relief therefrom to dump excessive fluid into sump 30.

The tractor bowl 11 may be selectively raised by the operator by moving the handle of control valve 21 to position R, as shown in FIG. 2, to thereby shift spool 28 to its maximum rightward position to stop fluid flow to conduit 32. Pressurized fluid is thereafter discharged through the control valve, conduit 31 and into leveling valve 18a. When the fluid pressure is sufficiently high, it is permitted to flow through check valves 35 and 36 of the leveling valve and directly into conduits 33 and 34 wherefrom it is transmitted to jacks 16a and 16b. Thus, the pistons 17a and 17b of the jack assemblies are selectively actuated to pivot the roadwheels in a clockwise direction about their axes to raise the vehicle to a predetermined distance above ground level. It should be further noted in FIG. 1 that conduit 31 may also be arranged to communicate with leveling valve 18d of the rear bogies to simultaneously effect a like function thereat. When the control valve is maintained in an automatic (A) position and roadwheel 12a is suddenly relieved of its load by being suspended over a hole in the ground, for example, the system will function in a manner similar to that above described in connection with a raising operation.

To lower the tractor bowl 11, the operator manipulates the lever of control valve 21 to the L position to thus prevent fluid flow through the control valve to conduit 31 or 32. Conduit 32 is arranged to communicate with sump 30 through suitably arranged passages of the control valve. Primarily due to the weight of the vehicle, fluid is thereafter discharged from conduits 33 and 34, through check valves 37 and 38, into conduit 32 and dumped into sump 30.

A relatively stable three-point suspension system, wherein the rear corner wheels 12d are locked and the front wheels are made to oscillate as a single member, may be provided, primarily for bulldozing and loading operations, by shifting spool 26 of lock-out valve 22 to position L, as shown in FIG. 2. This valve actuation allows pressurized fluid to flow through the lock-out valve, conduit 54 and into chambers 53 of the jack assemblies 16a and 16b (FIG. 1). Section 46 is thus moved to the dotted line position 46' (FIG. 2) to prevent fluid flow as between chambers 57a and 58 of the jack assembly. Section 46 of the rear jack assembly (not shown) is actuated in a like manner. A cross-over conduit 49 is simultaneously opened to permit fluid pressure to communicate to the corresponding cylinder which is operatively included in the jack assembly arranged on the opposite side of the vehicle. Since the front bogie arrangement on the opposite side of the vehicle comprises a fluid circuit similar to that shown in FIG. 2 and in particular a conduit 54 and fluid chamber 53, the like section 46 thereof will be shifted in a manner similar to that above described. A cross-over conduit similar to conduit 49 is not provided as between the rear jack assemblies.

The above sequence results in the two front roadwheels 12a being arranged to retract or compensate for one another and function as though they were mounted on a single equalizer bar-like member. As shown in FIG. 2, when section 46 assumes the dotted line position 46', orifice 52 and the internal bores of the plungers 46 and 47 communicate with conduit 49 to permit communication between fluid chambers 58 of the forward jack assemblies (only one is shown). As above stated, there is no cross-over line equivalent to conduit 49 connecting the oppositely disposed rear jack assemblies 16d and therefore, an effective three point suspension is maintained. For manufacturing purposes, the jack assemblies 16 are made substantially identical with no conduits similar to conduits 49 and 54 being arranged in communicating relationship with the intermediate jack assemblies 16b and 16c. Also, the leveling valves remain operative during this phase of vehicle operation so that the spring rates for intermediate roadwheels may be automatically increased to compensate for increased vehicle loading.

Actuation of the spool 28 of control valve 21 to either one of the hold positions (H) of vehicle operation, functions to close the fluid passages of leveling valve 18a and the jack assemblies to maintain a set spring rate regardless of the loads imposed on the roadwheels.

I claim:

1. A suspension system in a vehicle in combination with at least two pivotally arranged roadwheels located at a side of said vehicle, said suspension system comprising separate first and second spring rate change means each operatively associated with one of said roadwheels for pivoting them into a selected supported position, and means operatively associated with only one of said roadwheels and arranged to communicate with said first and second spring rate change means for selectively changing and balancing the spring rate of said first and second spring rate change means for pivoting said roadwheels in response to a predetermined pivotal movement of the roadwheel which is operatively connected to said means.

2. A suspension subsystem in a vehicle in combination with at least two pivotally arranged wheels located at a side of said vehicle, said subsystem comprising a spring rate change means operatively associated with each of said wheels for pivoting them into a predetermined load supporting position, a leveling valve means operatively communicating with each of said spring rate change means and only operatively connected to a first of said wheels, means for communicating said leveling valve means with each of said spring rate change means for maintaining or changing the spring rates thereof to maintain selected wheel position or to pivot said wheels into a new position or for automatically changing said spring rates in response to increased loading of said first wheel to return said wheels to said predetermined position and control means for selectively permitting said leveling valve means to operate either selectively or automatically.

3. A suspension subsystem in a vehicle in combination with a bogie arrangement comprising first and second pivotally arranged wheels located at a side of said vehicle, said subsystem comprising a spring rate change means for supporting each of said wheels in a predetermined pivotal position and means only operatively connected to said first wheel and arranged to communicate with each of said spring rate change means for automatically and sequentially changing the spring rate of each of said spring rate change means to return each of said wheels to said predetermined pivotal position in response to a predetermined loading of said first wheel.

4. The invention of claim 3 wherein each of said spring rate change means comprises separate chambers having pistons slidably mounted therein to separate each chamber into a first sealed portion containing a predetermined volume of a pressurized fluid and second portions arranged to normally communicate with each other to balance fluid pressure therebetween, said second portions further arranged to communicate with said means and a bellcrank assembly pivotally connecting one of said pistons to said first wheel whereby pivotal movements of said first wheel will effect a sliding of said last-mentioned piston in the chamber in which it is mounted.

5. A track-type vehicle having a plurality of bogies arranged on opposite sides thereof to engage endless tracks, said bogies comprising first and second wheels pivotally mounted on the same side of said vehicle, a suspension system comprising a spring rate change means for supporting said vehicle on each of said wheels and for maintaining said wheels in a predetermined pivotal position, valve means operatively connected to said first wheels and arranged to sequentially communicate with the spring rate change means for said first and second wheels for changing or maintaining the spring rate thereof to selectively pivotally position said wheels and means operatively associated with said valve means and arranged to be selectively actuated into a first lowering position for lowering said vehicle relative to said wheels, a second holding position for maintaining said vehicle at a predetermined distance from said wheels, a third raising position for raising said vehicle relative to said wheels or a fourth automatic position for returning said wheels to said first-mentioned pivotal position in response to a pivoting thereof due to varied loads which are imposed thereon.

6. In a vehicle having at least one bogie arranged on opposite sides thereof, said bogies comprising first and second pivotally arranged wheels located at a side of said vehicle, the invention which comprises a spring rate change means for supporting each of said wheels in a predetermined pivotal position, valve means only operatively connected to said first wheels and aranged to sequentially communicate with the spring rate change means for said first and second wheels for changing or maintaining the spring rate thereof, and means operatively associated with said valve means for selectively permitting the spring rate of said spring rate change means to be increased, decreased or maintained or to automatically permit said first wheels when subjected to increased loading to actuate said valve means for increasing the spring rate of each of said spring rate change means to pivot said wheels to a predetermined pivotal position.

7. The invention of claim 6 further comprising lockout valve means operatively associated between the spring rate change means of the first wheels of said bogies for selectively permitting said first wheels to dependently oscillate as a single member.

8. A track-type vehicle having a pair of supporting bogies arranged on opposite sides thereof, each pair of bogies being maintained in operative engagement with an endless track, each of said bogies comprising a first and second wheel located at a side of said vehicle, the second wheels of the bogies arranged intermediate the first wheels thereof, a bellcrank arrangement pivotally mounting each of said wheels on said vehicle, a jack assembly secured to said vehicle and having a piston pivotally secured to said bellcrank arrangement for receiving reciprocating movements therefrom pursuant to a pivoting of the operatively connected roadwheel, spring rate change means included in said jack assembly and operatively associated with the piston thereof for pivoting said roadwheel into a selected position, a leveling valve having a spool slidably mounted therein, linkage means operatively connecting said spool to only said bellcrank arrangement of said first wheel for reciprocating said spool in response to pivotal movements of said first wheel, means operatively communicating said leveling valve with the spring rate change means of the pair of bogies on each side of the vehicle and control means operatively communicating with said leveling valve for transmitting pressurized fluid to said spring rate change means for selective actuation to a lowering, holding, automatic or raising position to pivot said roadwheels into a selected vehicle supporting position.

9. The invention of claim 8 wherein said leveling valve further comprises a shuttle valve means for directing pressure to the spring rate change means which is operatively connected to the first wheel of each bogie subsequent to directing pressure to the spring rate change means of the second wheel thereof when said control means is maintained in an automatic operating position.

10. The invention of claim 8 further comprising lockout valve means operatively associated with the spring rate change means of the first wheel of each bogie and dependently associating the pistons which are operatively connected to a pair of said first wheels which are arranged on opposite sides of said vehicle for permitting the last mentioned pair of wheels to dependently oscillate as a single member and for locking the other of said first wheels against spring rate changes whereby a three-point suspension system is effected.

11. A suspension system in a vehicle in combination with at least two pivotally arranged roadwheels located at a side of said vehicle, said suspension system comprising spring rate change means operatively associated with each of said roadwheels for pivoting them into a selected supported position and means responsive to pivotal movement of one of said roadwheels for sequentially changing the spring rates of said spring rate change means.

12. A suspension system in combination with at least two pivotally arranged roadwheels, said suspension system comprising separate first and second spring rate change means each operatively associated with one of said roadwheels for pivoting them into a selected supported position, and means operatively associated with only one of said roadwheels and arranged to communicate with said first and second spring rate change means for selectively changing and balancing the spring rate of said first and second spring rate change means for pivoting said road wheels in response to a predetermined pivotal movement of the roadwheel which is operatively connected to said means, said means comprising sequence valve means for subsequently changing the spring rate supporting the roadwheel which is operatively connected to said means after changing the spring rate which supports the other of said roadwheels.

13. A suspension subsystem in combination with at least two pivotally arranged wheels comprising a spring rate change means operatively associated with each of said wheels for pivoting them into a predetermined load supporting position, a leveling valve means operatively communicating with each of said spring rate change means and only operatively connected to a first of said wheels, means for communicating said leveling valve means with each of said spring rate change means for maintaining or changing the spring rates thereof to maintain selected wheel position or to pivot said wheels into a new position or for automatically changing said spring rates in response to increased loading of said first wheel to return said wheels to said predetermined position and control means for selectively permitting said leveling valve means to operate either selectively or automatically, said leveling valve means comprising means for changing the spring rate supporting said first wheel subsequent to changing the spring rate which supports a second of said wheels during automatic operation thereof.

14. A suspension subsystem in combination with a bogie arrangement comprising first and second pivotally arranged wheels, said subsystem comprising a spring rate change means for supporting each of said wheels in a predetermined pivotal position and means only operatively connected to said first wheel and arranged to commuicate with each of said spring rate change means for automatically and sequentially changing the spring rate of each of said spring rate change means to return each of said wheels to said predetermined pivotal position in response to a predetermined loading of said first wheel, said means comprising valve means for changing the spring rate supporting said first wheel subsequent to changing the spring rate which supports said second wheel.

References Cited by the Examiner

UNITED STATES PATENTS

| 2,312,389 | 3/1943 | Cordes | 37—124 |
|---|---|---|---|
| 2,828,138 | 3/1958 | Brueder | 267—15 |
| 2,860,715 | 11/1958 | Bouffort | 180—9.2 |
| 2,908,508 | 10/1959 | Brunsdon et al. | 267—65 X |
| 2,978,254 | 4/1961 | Bundorf | 267—64 X |
| 2,978,256 | 4/1961 | Bertsch et al. | |
| 3,048,193 | 8/1962 | Cislo | 267—65 X |
| 3,063,510 | 11/1962 | Hunger et al. | 180—9.2 |
| 3,071,394 | 1/1963 | Miller. | |

OTHER REFERENCES

German printed application, 1,091,905, Oct. 20, 1960.

BENJAMIN HERSH, *Primary Examiner.*

ARTHUR L. LA POINT, *Examiner.*

R. J. JOHNSON, *Assistant Examiner.*